United States Patent
Ackley et al.

Patent Number: 5,286,982
Date of Patent: Feb. 15, 1994

[54] HIGH CONTRAST RATIO OPTICAL MODULATOR

[75] Inventors: Donald E. Ackley, Paradise Valley; Herbert Goronkin, Tempe; Michael S. Lebby, Chandler, all of Ariz.

[73] Assignee: Motorola, Inc., Schaumburg, Ill.

[21] Appl. No.: 796,285

[22] Filed: Nov. 22, 1991

[51] Int. Cl.$^5$ .................. H01L 27/12; H01L 29/161; H01L 27/14

[52] U.S. Cl. ..................... 257/14; 257/94; 257/184; 257/432; 257/615

[58] Field of Search ............. 257/14, 94, 184, 432, 257/615; 372/45

[56] References Cited

U.S. PATENT DOCUMENTS 5,172,384  12/1992  Goronkin et al. ............... 372/45

OTHER PUBLICATIONS

IEEE Journal of Quantum Electronics, vol. 26, No. 2, pp. 296–304 Feb. 1990 by Lengyel et al.

*Primary Examiner*—Mark V. Prenty
*Attorney, Agent, or Firm*—Robert F. Hightower; Joe E. Barbee

[57] ABSTRACT

A thin transition layer (13) is employed to provide alignment between an electron wave function (29) and a hole wave function (37) of an optical modulator (10) for a wide range of applied voltage values that are less than a predetermined value. Over this range of voltages, the modulator (10) is in an off state and substantially absorbs incident light (19). For applied voltages in excess of the predetermined value, the electron (29) and hole wave (37) function alignment is diminished thereby allowing light (19) to be transmitted through the modulator (10).

10 Claims, 2 Drawing Sheets

HIGH CONTRAST RATIO OPTICAL MODULATOR

This application is related to copending U.S. patent application No. 07/695,062 filed on May 3, 1991 and now U.S. Pat. No. 5,172,384 entitled "Low Threshold Current Laser" which has some common inventors and is assigned to the same assignee as the present application.

BACKGROUND OF THE INVENTION

The present invention relates, in general, to semiconductor devices, and more particularly, to a novel optical semiconductor device.

Previously, the semiconductor industry has produced optical modulators in the form of semiconductor devices that vary the amount of light passing through the modulator. Generally, the amount of light passing through the modulator is proportional to the voltage applied to the modulator. In the off state, the modulator absorbs incident light. As the applied voltage increases, the intensity of light transmitted through the modulator also increases. Typically, the transmitted light intensity varies gradually from the off state to the on state. Therefore, a large voltage change is generally required to switch these previous modulators from the off state all the way to the on state. For applications such as digital switching of optical signals, telecommunications, and other applications, the large voltage swings required by the previous optical modulators is a disadvantage.

Another disadvantage of the previous optical modulators is the operating wavelength or the wavelength of light that can be used with the modulators. As the applied voltage varies, the wavelength of light that has the highest transmission (lowest absorption) through the previous modulators also varies. Often, the wavelengths that can be transmitted with low absorption are wavelengths that are not entirely absorbed in the off state. Consequently, this wavelength variation with voltage typically results in a low contrast ratio between the off state and the on state of the previous modulators.

Accordingly, it is desirable to have an optical modulator that has a sharp transition from the off state to the on state, that requires a small voltage change to transition from the off state to the on state, and that has a high contrast ratio.

SUMMARY OF THE INVENTION

Briefly stated, the present invention includes substantially maintaining alignment between an electron wave function and a hole wave function of an optical modulator for applied voltage values that are less than a predetermined value. For these applied voltage values, the modulator is in an off state and substantially absorbs incident light. For applied voltages in excess of the predetermined value, alignment between the electron and hole wave functions is rapidly diminished thereby placing the modulator in an on state and allowing light to be transmitted through the modulator. Therefore, a small voltage change around the predetermined voltage value switches the modulator from the on state to the off state.

DETAILED DESCRIPTION OF THE DRAWINGS

Figure 1:
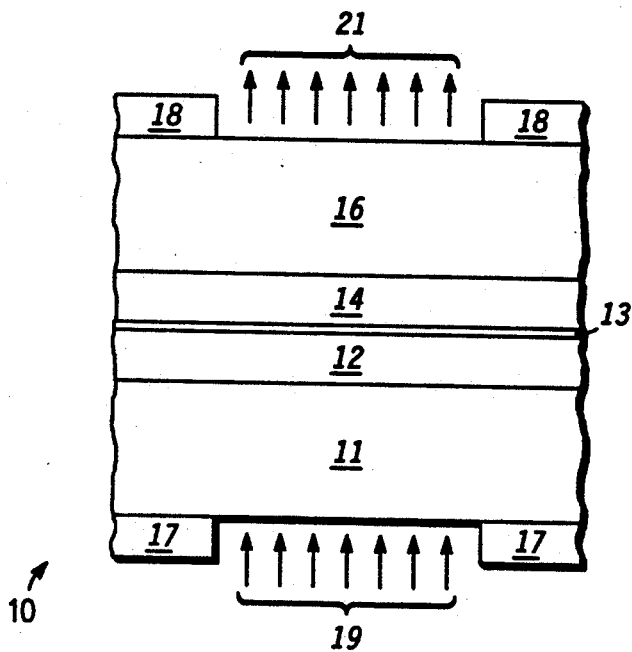
FIG. 1 illustrates a cross-section of an enlarged portion of an optical modulator in accordance with the present invention.

FIG. 1 illustrates an enlarged portion of a semiconductor light modulator 10 that has, among other things, a sharp transition and a high contrast ratio between the off state and the on state. As will be seen hereinafter, the sharp transition and the high contrast ratio are facilitated by using a thin transition layer 13 which assists in aligning an electron wave function and a hole wave function of modulator 10. Modulator 10 includes a confinement layer 11 and a confinement layer 16 which are formed from III-V compound semiconductor materials that have a large band gap. An active layer 12 and an active layer 14 function as a single active layer that is sandwiched between confinement layer 11 and confinement layer 16. Active layer 12 and active layer 14 are both formed from III-V compound semiconductor materials that have a smaller band gap than the band gap of confinement layers 11 and 16. Various combinations of III-V semiconductor materials can provide a suitable band gap structure. One such combination uses aluminum gallium arsenide (AlGaAs) for confinement layers 11 and 16, and gallium arsenide (GaAs) for active layers 12 and 14. For such a combination, the aluminum arsenide mole fraction of confinement layers 11 and 16 could range from approximately 15% to approximately 100% which becomes aluminum arsenide ($Al_{0.15}Ga_{0.85}As$—AlAs). Another suitable material combination includes using indium phosphide (InP) for confinement layers 11 and 16, and indium gallium arsenide for active layers 12 and 14. Inserted between active layer 12 and active layer 14 is transition layer 13 which is a very thin layer of a material that has a smaller band gap than the band gap of active layers 12 and 14. For the two material combinations discussed above, transition layer 13 could be indium arsenide (InAs) or indium antimonide (InSb) respectively. It should be noted that other small band gap III-V semiconductor materials including, but not limited to, ternary compounds such as indium arsenic antimonide (InAsSb) and indium gallium arsenide (InGaAs) are also applicable. It should also be noted that active layers 12 and 14, and transition layer 13 could be a multiple quantum well structure with a thin transition layer inserted into each active layer of the structure. One example of a multiple quantum well structure is a series of alternating layers of AlGaAs barrier layers and GaAs active layers wherein a thin InAs transition layer is within each GaAs active layer.

In the preferred embodiment, confinement layers 11 and 16 are both aluminum gallium arsenide having an aluminum arsenide mole fraction of approximately 32% ($Al_{0.32}Ga_{0.68}As$) with confinement layer 11 doped N-type and confinement layer 16 doped P-type. In this preferred embodiment, active layers 12 and 14 are formed from GaAs, and a very thin layer of indium arsenide is used to form transition layer 13.

Some of the materials that have a band gap suitable for transition layer 13, have a large lattice constant difference with the materials that are suitable for active layers 12 and 14. These large lattice constant differences, or spacing of the atoms in the material's lattice structure, can cause strains or stresses which could induce misfit dislocations or cracks in the materials. The thickness of transition layer 13 that produces such misfit dislocations is commonly referred to as the critical thickness. Consequently, it is desirable for transition layer 13 to have a thickness that is less than the critical thickness. In the preferred embodiment, transition layer 13 has a thickness of approximately a monolayer, that is, a layer having an average thickness equal to approximately a molecule or a fraction of a molecule of the material used for transition layer 13 (an InAs molecule). The very small band gap combined with the very small thickness or width of transition layer 13 forms a very deep and very thin quantum well within transition layer 13 as will be seen hereinafter.

A cathode electrode 17 and an anode electrode 18 are used to apply an external voltage to modulator 10. Cathode electrode 17 is on confinement layer 11 and has an opening through which incident light 19, represented by arrows, can pass through electrode 17 and enter confinement layer 11. For applied voltage values that are below a predetermined value, modulator 10 is in an off state. In the off state, incident light 19 passes through confinement layer 11 and is absorbed in transition layer 13 and active layers 12 and 14 as will be seen hereinafter. Applying a voltage in excess of the predetermined voltage, places modulator 10 in an on state that allows incident light 19 to pass through modulator 10 and exit through an opening in anode 18 as transmitted light 21, represented by arrows.

It should also be noted that various buffer layers, low resistance contact layers, and other substrate or support layers may be between anode 18 and confinement layer 16, and between cathode 17 and contact layer 11.

Figure 2:
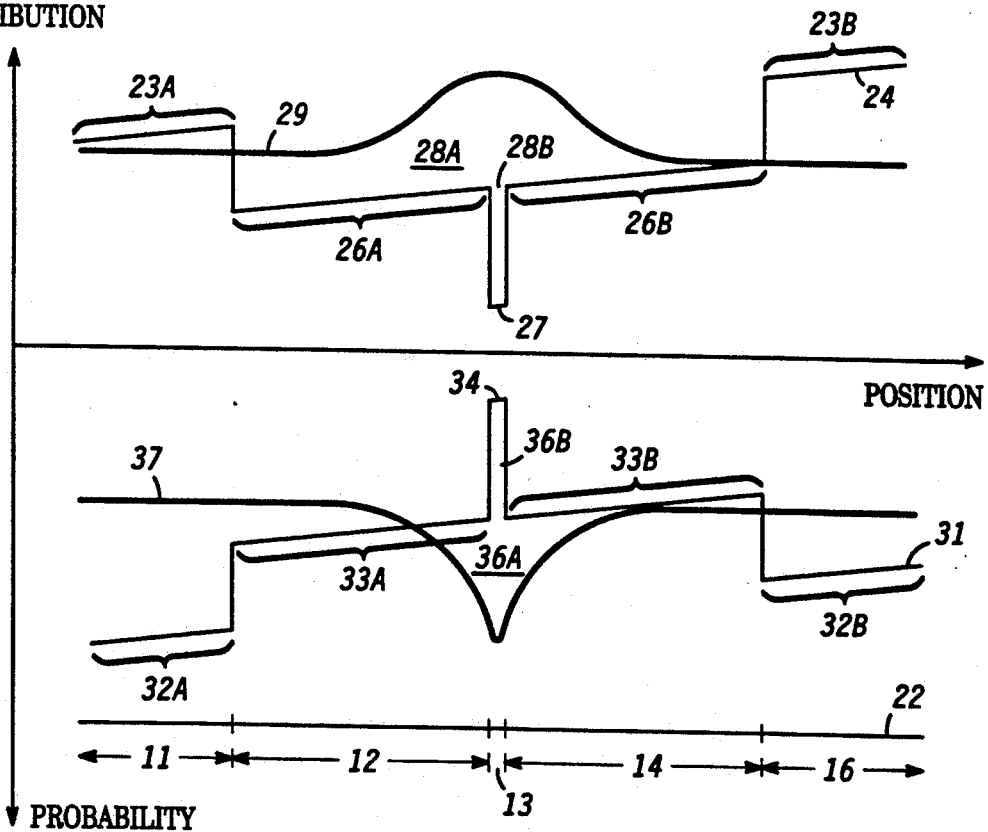
FIG. 2 is a graph illustrating energy levels and wave functions in the modulator of FIG. 1 in accordance with the present invention.

FIG. 2 is an energy level diagram illustrating electron and hole energy levels as well as electron and hole wave functions in both the conduction and valence bands of modulator 10 that is shown in FIG. 1. It is understood that as used herein, the term "energy diagram", singular or plural, means a diagram or graph that illustrates various levels of potential energy. For convenience of explanation, the following description of the energy diagrams will have references to both FIG. 1 and FIG. 2. The abscissa represents position within modulator 10. For convenience, a reference line 22 is used to illustrate the position of the various layers in modulator 10 of FIG. 1. Sections of reference line 22 that represent layers of FIG. 1, have the same reference numerals. The ordinate represents energy for the energy diagrams and carrier distributions for the wave function diagrams. An electron energy diagram 24 represents the energy of the bottom of the conduction band of modulator 10, and a hole energy diagram 31 represents the energy of the top of the valence band of modulator 10. Although it is understood by those of ordinary skill in the art that free electrons have higher energy than the energy illustrated by energy diagram 24, it is common to use energy diagram 24 as a reference for discussion. This also applies to holes which have lower energy than that illustrated by energy diagram 31. Electron energy diagram 24 illustrates the energy of the bottom of the conduction band of various layers of modulator 10. An energy level 23A and an energy level 23B represent the energy of the bottom of the conduction band in confinement layers 11 and 16 respectively, while an energy level 26A and an energy level 26B represent the bottom of the conduction band in active layer 12 and active layer 14 respectively. An energy level 27 represents the conduction band's lowest energy in transition layer 13. Energy level 27 and energy levels 26A and 26B form a quantum well that has two portions, a quantum well 28A and a quantum well 28B. Within quantum wells 28A and 28B, there are various quantized energy levels that may be occupied by electrons. The lowest quantized energy level is the first to be occupied by an electron. Once a quantized energy level is occupied, the higher energy level of confinement layer energy levels 23A and 23B form a barrier that confines the electron within quantum wells 28A and 28B thereby confining the electron to transition layer 13 and active layers 12 and 14. The distribution of electrons at locations within the conduction band's quantized energy levels is illustrated by an electron wave function 29. Upward excursions in electron wave function 29 indicate increased electron concentration at that point.

In a similar manner, the valence band's top edge or highest energy is represented by hole energy diagram 31. A confinement layer energy level 32A and a confinement layer energy level 32B represent the valence band's top in confinement layers 11 and 16 of modulator 10. Similarly, an energy level 33A represents the valence band's top in active layer 12, an energy level 33B represents the top in active layer 14, and an energy 34 represents the valence band's top in transition layer 13. Energy levels 33A, 33B, and 34 form a quantum well that includes a quantum well 36A and a quantum well 36B. Quantum wells 36A and 36B assist in confining holes to transition layer 13 and to active layers 12 and 14. As with electron energy diagram 24, holes occupy quantized energy levels within the valence band of modulator 10. Holes first occupy the highest quantized energy level, near energy level 34 of quantum well 36B, then progressively occupy lower quantized energy levels. The distribution of holes at various locations within the valence band's quantized energy levels is illustrated by a hole wave function 37. Downward excursions of hole wave function 37 indicate increased hole concentration at that point in the valence band.

Alignment of electron wave function 29 and hole wave function 37 is important to the operation of modulator 10. In the off state, incident light 19 travels through confinement layer 11 and is absorbed by the lattice structure of modulator 10 thereby generating an electron-hole pair or an exciton. The energy transferred to the electron-hole pair by the absorption stimulates the electron into quantum wells 28A and 28B of the conduction band, and the hole into quantum wells 36A and 36B of the valence band. The electron-hole pair remains captured in quantum wells 28A and 28B, and 36A and 36B for some finite time after which they recombine. During the recombination, the energy lost by the electron and the hole is transferred to thermal energy which is dissipated by modulator 10. As light 19 continues to enter confinement layer 11, an equilibrium is reached between the generation of electron-hole pairs and the recombination of electron-hole pairs from quantum wells 28A and 28B, and quantum wells 36A and 36B. The probability that an electron in the conduction band and a hole in the valence band will recombine is illustrated by the product of electron wave function 29 and hole wave function 37. The larger the magnitude of the wave function product at a particular point along modulator 10, the higher the probability that the electron-hole pair will recombine at that point. Consequently, modulator 10 can absorb the greatest amount of light energy when the peak of electron wave function 29 completely overlaps the peak of hole wave function 37.

One effect of transition layer 13 is to maximize the alignment of wave functions 29 and 37. The small band gap of transition layer 13 ensures that quantum wells 28B and 36B are deep and that there is a small energy gap between quantum well 28B and quantum well 36B. This small band gap draws the electrons and holes toward quantum wells 28B and 36B thereby increasing the concentration of electrons and holes near quantum wells 28B and 36B, and substantially centering the peaks of the electron and hole wave functions to quantum wells 28B and 36B. The high overlap in the peaks of electron wave function 29 and hole wave function 37 increases the probability of electron-hole recombination thereby maximizing the amount of light that can be absorbed by modulator 10.

As an external voltage is applied between cathode 17 and anode 18, a voltage drop is created across modulator 10. This voltage drop shifts or tilts the energy level of electron energy diagrams 24 and 31, as shown in FIG. 2, with the higher energy level being close to the negative voltage and the lower energy level near the positive voltage. Due to the depth of quantum wells 28B and 36B, electrons and holes remain concentrated near quantum wells 28B and 36B. As a result, wave functions 29 and 37 remain substantially centered to quantum wells 28B and 36B respectively. Consequently, the electric field created by the applied voltage does not adversely affect the overlap of electron wave function 29 and hole wave function 37, and the maximum amount of light that can be absorbed by modulator 10 remains substantially constant. As the value of the external voltage is increased, the relationship between electron wave function 29 and hole wave function 37 remains substantially constant until the applied voltage reaches a predetermined value that produces an electric field that is strong enough to deplete carriers from the vicinity of quantum wells 28A and 28B, and 36A and 36B. At this electric field value, typically greater than 170 Kv/cm, the electron and hole wave function overlap is substantially eliminated, and modulator 10 becomes substantially transparent. The sudden elimination of the wave function overlap produces a sharp transition from the off state of blocking light to the on state of transmitting light. Consequently, transition layer 13 provides modulator 10 with a sharp transition from the off state to the on state. This sharp transition is an important advantage provided by modulator 10.

Figure 3:
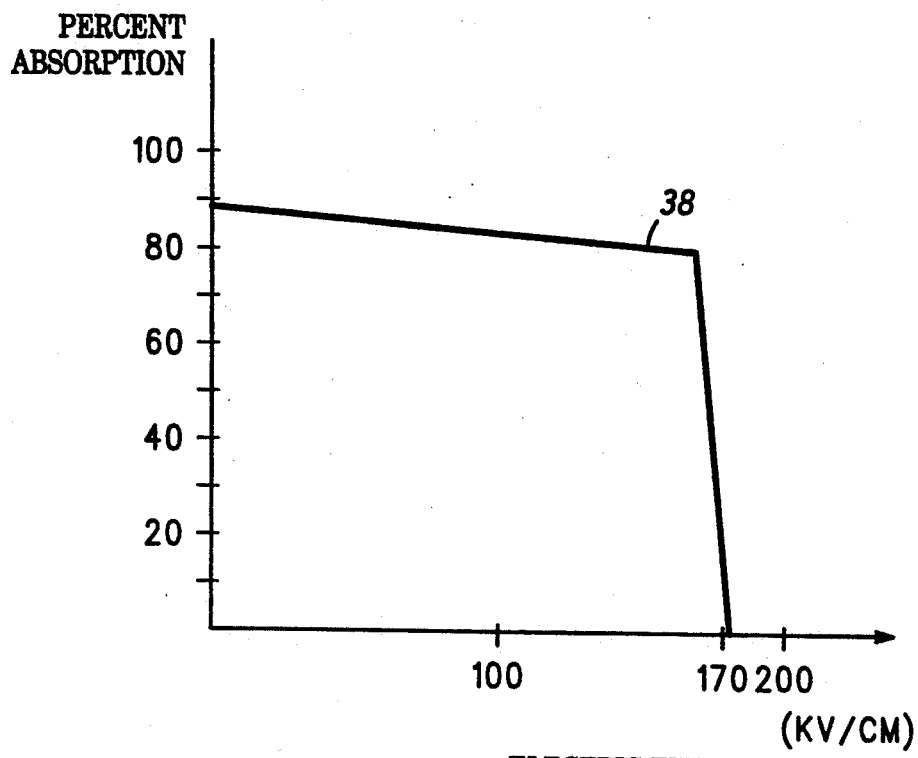
FIG. 3 is a graph illustrating light absorption in the modulator of FIG. 1 in accordance with the present invention.

FIG. 3 is a graph illustrating the percent of incident light that is absorbed by modulator 10 of FIG. 1 as a function of the electric field developed across active layers 12 and 14. This electric field is a direct response to an external voltage applied to modulator 10 of FIG. 1. The ordinate represents the percent of incident light that is absorbed and the abscissa indicates the electric field in Kv/cm. A plot 38 indicates that below a predetermined electric field value, substantially all incident light is absorbed. This absorption remains substantially constant until the applied voltage exceeds a predetermined value thereby producing a predetermined electric field value. Then, there is a rapid transition to approximately zero percent absorption. Above the predetermined voltage, modulator 10 of FIG. 1 is turned on and transmits substantially all incident light. This sharp transition permits modulator 10 of FIG. 1 to operate in a small voltage range around the predetermined voltage value thereby providing a large change in light transmission for a small change in voltage. This is a significant improvement over prior semiconductor modulators.

Referring back to FIG. 2 and FIG. 1, the small band gap of transition layer 13 of FIG. 1 is also important in providing modulator 10 of FIG. 1 with a high contrast ratio between the on state and the off state. The wavelength of light that can be absorbed by and transmitted by modulator 10 of FIG. 1 is determined by the energy differential between the electrons and the holes that recombine. By maintaining an overlap between the electron and hole wave functions for a wide range of applied voltages, the energy levels from which electrons and holes transition during recombination remains substantially constant. Therefore, the wavelengths of light that are absorbed in the off state of modulator 10 and the wavelengths of light that are transmitted in the on state of modulator 10 remain substantially constant for various values of applied voltage.

Figure 4:
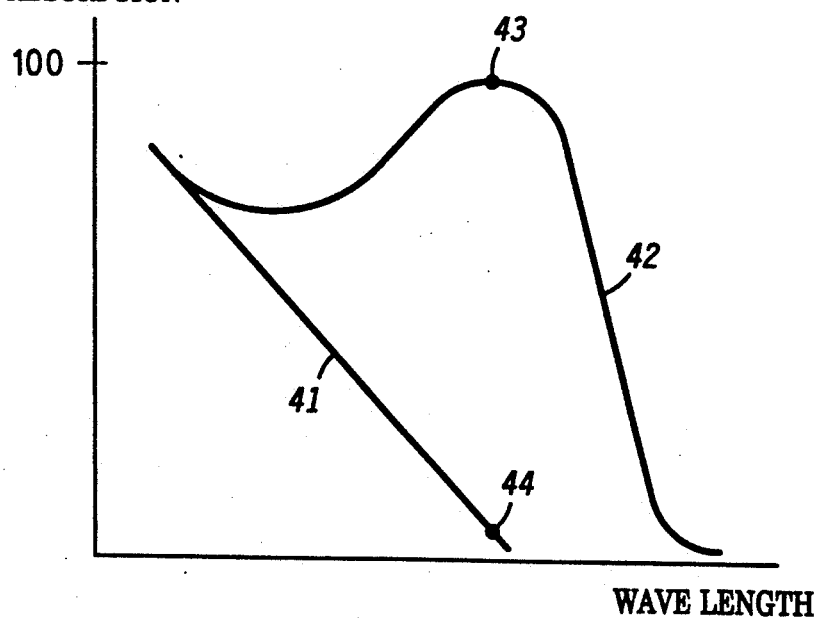
FIG. 4 is a graph illustrating absorption for various wavelengths in the modulator of FIG. 1 in accordance with the present invention.

FIG. 4 is a graph illustrating the percent absorption of various light wavelengths for two different voltage values that are applied to modulator 10 of FIG. 1. The ordinate indicates percent absorption, and the abscissa indicates light wavelength. A plot 41 represents the absorption of various wavelengths at an applied voltage that exceeds the predetermined voltage that is required to place modulator 10 of FIG. 1 in an on state. A point 44 on plot 41 represents the wavelengths of light or electromagnetic waves that can be transmitted through modulator 10 of FIG. 1 with substantially zero absorption. A plot 42 represents the absorption of various light wavelengths at an applied voltage of approximately zero. A point 43 represents one wavelength that is substantially absorbed at this applied voltage value. It can be seen that for the particular structure of modulator 10 of FIG. 1 there is at least one wavelength that can be substantially absorbed at one applied voltage value and substantially transmitted at another applied voltage value. The large differential between the amount of light absorbed at point 44 and the amount of light transmitted at point 43 provides modulator 10 of FIG. 1 with a high contrast ratio between the off state and the on state.

By now it should be appreciated that there has been provided a novel way to fabricate an optical modulator. Positioning a thin layer of a small band gap material in the active layer of the optical modulator substantially maintains alignment between the modulator's electron and hole wave functions over a wide range of applied voltages. Above a predetermined voltage, the wave function alignment is rapidly diminished. The rapid change in wave function alignment around a predetermined voltage provides the modulator with a sharp off to on transition. Due to the sharp transition, a small voltage change around the predetermined value can be used to switch the modulator from an off state to an on state. In addition, the wave function alignment provided by the thin transition layer also facilitates maintaining a substantially constant operating wavelength over the applied voltage range thereby providing a high contrast ratio. The small voltage swing and high contrast ratio facilitates using the optical modulator in high speed digital applications such as digital switching of optical signals, telecommunications, and other optical applications.

We claim:

1. A high contrast ratio optical modulator comprising:
   an aluminum gallium arsenide first confinement layer;
   a gallium arsenide active layer on a first surface of the first confinement layer;
   an aluminum gallium arsenide second confinement layer on the active layer wherein a first surface of the second confinement layer is in contact with the active layer; and
   a transition layer within the active layer of the modulator wherein the transition layer forms a quantum well that substantially maintains alignment between an electron wave function and a hole wave function of the modulator for voltage values applied to the modulator that are less than a predetermined value which facilitates absorbing light within the active layer thereby blocking light from passing through the modulator, and wherein the transition layer facilitates shifting the electron wave function and the hole wave function at voltage values applied to the modulator that are greater than the predetermined value thereby transmitting light through the modulator.

2. The modulator of claim 1 wherein the transition layer has an average thickness of at least approximately a monolayer.

3. The modulator of claim 1 wherein the transition layer includes a layer of indium arsenide.

4. The modulator of claim 1 further including a first metal contact on a second surface of the first confinement layer and a second metal contact on a second surface of the second confinement layer wherein the first metal contact and second metal contact each have an opening that permits light to pass through the modulator.

5. The modulator of claim 1 wherein the transition layer includes a layer of a material selected from the group consisting of indium arsenide, indium antimonide, indium arsenic antimonide, and indium gallium arsenide.

6. The modulator of claim 1 wherein the aluminum gallium arsenide first confinement layer and the aluminum gallium arsenide second confinement layer each have an aluminum arsenide mole fraction between approximately fifteen percent and approximately one hundred percent.

7. The modulator of claim 1 wherein the aluminum gallium arsenide first confinement layer and the aluminum gallium arsenide second confinement layer each have an aluminum arsenide mole fraction of approximately thirty-two percent.

8. A method of increasing the contrast ratio of a semiconductor optical modulator comprising:
   providing a III-V compound active layer of the modulator, the active layer having a first band gap, an electron wave function, and a hole wave function;
   using a thin transition layer within the active layer, the thin transition layer having a second band gap that is smaller than the first band gap for substantially maintaining alignment between the electron wave function and the hole wave function while a first voltage is applied to the modulator for the purpose of preventing light from passing through the active layer, and diminishing alignment between the electron wave function and the hole wave function while a second voltage that is greater than the first voltage is applied to the modulator for the purpose of passing light through the modulator.

9. The method of claim 8 wherein providing the III-V compound active layer of the modulator includes providing a gallium arsenide active layer.

10. The method of claim 8 wherein using the thin transition layer within the active layer includes using a thin indium arsenide transition layer within the active layer.

* * * * *